United States Patent
Serres Piole et al.

(10) Patent No.: US 10,150,055 B2
(45) Date of Patent: *Dec. 11, 2018

(54) METHOD FOR SEPARATING ISO-ALKANES AND CYCLOALKANES FROM AN OIL

(71) Applicant: TOTAL SA, Courbevoie (FR)

(72) Inventors: Coralie Serres Piole, Pau (FR); Jean-Bernard Berrut, Pau (FR)

(73) Assignee: Total SA, Courbevoie (FR)

( * ) Notice: Subject to any disclaimer, the term of this patent is extended or adjusted under 35 U.S.C. 154(b) by 208 days.

This patent is subject to a terminal disclaimer.

(21) Appl. No.: 14/651,303

(22) PCT Filed: Dec. 10, 2013

(86) PCT No.: PCT/EP2013/076103
§ 371 (c)(1),
(2) Date: Jun. 11, 2015

(87) PCT Pub. No.: WO2014/090812
PCT Pub. Date: Jun. 19, 2014

(65) Prior Publication Data
US 2015/0328564 A1    Nov. 19, 2015

(30) Foreign Application Priority Data

Dec. 11, 2012   (FR) .................... 12 61888

(51) Int. Cl.
*B01D 15/14*    (2006.01)
*B01D 15/26*    (2006.01)
(Continued)

(52) U.S. Cl.
CPC .......... *B01D 15/265* (2013.01); *B01D 15/14* (2013.01); *B01D 15/1871* (2013.01);
(Continued)

(58) Field of Classification Search
None
See application file for complete search history.

(56) References Cited

U.S. PATENT DOCUMENTS 4,952,747 A      8/1990  Alexander et al.
2002/0177743 A1* 11/2002 Dahl ................... C07C 4/00
                                                585/16

(Continued)

FOREIGN PATENT DOCUMENTS

EP        0399851     11/1990
WO   WO 2014/090812   6/2014

OTHER PUBLICATIONS

International Search Report (and its English translation) dated Jan. 20, 2014 for PCT Application No. PCT/EP2013/076103 filed Dec. 10, 2013 which is the parent application to the instant application; 7 pages.

(Continued)

*Primary Examiner* — Tam M Nguyen
(74) *Attorney, Agent, or Firm* — Harness, Dickey & Pierce, P.L.C.; Anthony G. Fussner

(57) ABSTRACT

Method for the processing of a mixture of organic compounds, in particular of an oil, in order to recover different constituents therefrom. This method makes it possible to separate a fraction of iso-alkanes and cycloalkanes from a sample of a mixture of organic compounds, said method comprising a separation step by liquid chromatography.

11 Claims, 6 Drawing Sheets

(51) Int. Cl.
*B01D 15/42* (2006.01)
*C10G 25/03* (2006.01)
*C10G 29/04* (2006.01)
*B01D 15/18* (2006.01)

(52) U.S. Cl.
CPC .......... *B01D 15/424* (2013.01); *C10G 25/03* (2013.01); *C10G 29/04* (2013.01)

(56) References Cited

U.S. PATENT DOCUMENTS

| | | | |
|---|---|---|---|
| 2005/0159634 A1* | 7/2005 | Dahl | B82Y 10/00 585/17 |
| 2008/0053902 A1 | 3/2008 | Koegler et al. | |
| 2017/0130163 A1* | 5/2017 | Kelliher | B01D 15/185 |

OTHER PUBLICATIONS

Zhibin Wei et al: "Thiadiamondoids as proxies for the extent of thermochemical sulfate reduction", Organic Chemistry, vol. 44, Mar. 1, 2012, pp. 53-70.

Michiele Audino et al: "Macrocyclic alkanes in crude oils and sediment extracts; enrichment using molecular sieves", Organic Chemistry, vol. 35, No. 5, May 1, 2004, pp. 661-663.

* cited by examiner

METHOD FOR SEPARATING ISO-ALKANES AND CYCLOALKANES FROM AN OIL

CROSS REFERENCE TO RELATED APPLICATIONS

This patent application is a U.S. national stage filing under 35 U.S.C. § 371 of International Application No. PCT/EP2013/076103 filed Dec. 10, 2013 (published as WO 2014/090812 on Jun. 19, 2014, which claims priority to and benefit of France application No. 1261888 filed Dec. 11, 2012. The disclosures of the applications identified in this paragraph are incorporated herein by reference in their entirety.

FIELD OF THE INVENTION

The present invention relates to a method for the processing of a mixture of organic compounds, in particular of an oil, in order to recover different constituents from it. In particular, the objective of this method is to allow the separation of a fraction of iso-alkanes and cycloalkanes from a sample of a mixture of organic compounds, this method comprising a separation step by liquid chromatography.

When it is applied to an organic mixture of mineral oil type, the method of the invention makes it possible to isolate mixtures of biomarker compounds characteristic of the origin of these oils, such as in particular diamondoids.

Moreover, the present invention relates to a separation kit by liquid chromatography as well as a device for separating by liquid chromatography and analysis a sample, in particular a sample of a mixture of organic compounds.

Finally, the invention relates to the use of such a kit or such a device for separating a fraction of iso-alkanes and cycloalkanes from a sample comprising a mixture of organic compounds.

TECHNICAL BACKGROUND

Petroleum is a mineral oil formed by a mixture of organic compounds trapped in very diverse geological formations. Thus, each petroleum deposit holds a specific quality of petroleum, determined by the relative proportions of the different organic compounds, including biomarkers, of which it is constituted.

These organic compounds are essentially hydrocarbons, including saturated compounds: the n-alkanes, iso-alkanes and cycloalkanes, aromatic compounds, resins or also asphaltenes.

Among the cycloalkanes, the diamondoids, tricyclic terpanes, hopanes, steranes may be mentioned. Among the iso-alkanes, pristane, phytane may be mentioned.

The diamondoids are 3-dimensional polycyclic saturated organic compounds which are in the form of a cage and can be substituted, or unsubstituted, by alkyl groups. Among these diamondoids, adamantane ($C_{10}H_{16}$ compound), diamantane ($C_{14}H_{20}$) or also triamantane ($C_{18}H_{24}$) may be mentioned non limitatively, as well as their homologues comprising at least one alkyl branch.

These diamondoids are therefore natural constituents of petroleum, which is also called "oil" in the remainder of the present description. The diamondoids are commonly found in oils at concentrations greater than 1 ppm.

Because of their unique physico-chemical properties (high thermal stability, high melting and vapour pressure points), there has for several years been growing interest in diamondoids in a large number of fields (pharmaceuticals industry, medicine, nanotechnology, micro-electronics, etc.) including the petroleum sector.

Moreover, due to their high stability in oils, it is beneficial to carry out analyses, both qualitative and quantitative, of these diamondoids in order to have a better understanding of the petroleum systems, in particular of biodegraded and cracked oils. Such analyses make it possible in particular to evaluate the geological maturity of an oil field and/or the level of thermal maturity of oils, to distinguish between two oils and/or to characterize mixtures of oils, to evaluate the degree of advancement of the biodegradation of the oils, to determine the oil/oil or mother rock/oil correlations. The usefulness of the biomarkers present in the oils, and of the diamondoids in particular, for carrying out these analyses, explains the increase in the number of studies carried out aiming at separating and/or concentrating and/or identifying the iso-alkanes and the cycloalkanes in general, and the diamondoids, in particular.

Such qualitative and/or quantitative analyses are in general carried out by gas chromatography (GC) or by gas chromatography coupled with mass spectrometry (GC/MS). As for the isotopic analyses, they are carried out by gas chromatography coupled with isotope ratio mass spectrometry (GC/irMS).

However, in view of the wide variety of compounds forming the oil and the very small quantity of these compounds of interest within an oil, it proves necessary to prepare the sample of oil before carrying out its chromatographic analysis (by GC, GC/MS or GC/irMS) in order to purify, to isolate and/or to concentrate the specific compounds that are to be studied.

Thus, methods for separating fractions of iso-alkanes and cycloalkanes which comprise several steps are described in the literature.

Reference can in particular be made to the scientific publication by L. Huang et al. ("*A novel method for isolation of diamondoids from crude oils for compound-specific isotope analysis*"—Organic Geochemistry—42 (2011) p.566-571) which describes a three-step method:
- a first separation step by liquid chromatography through a column comprising an activated silica gel in order to collect a saturated fraction of hydrocarbons comprising the n-alkanes and the cyclic and branched hydrocarbons
- a step of concentration under nitrogen of this saturated fraction of hydrocarbons,
- a second separation step of this concentrated saturated fraction of hydrocarbons by liquid chromatography through a column comprising a molecular sieve (ZSM-5 zeolite of silicalite type) in order to collect the fraction of cyclic and branched hydrocarbons.

Reference can also be made to the scientific publication by M. Audino et al. ("*Macrocyclic alkanes in crude oils and sediment extracts: enrichment using molecular sieves*"—Organic Geochemistry—35 (2004) p. 661-663) which describes a method comprising at least two successive steps of chromatographic separation on columns, each columns comprising a defined molecular sieve, it being noted that an intermediate filtration step followed by an intermediate evaporation step is necessary between each chromatographic separation step.

It is observed that the methods that have just been described comprise at least two separation steps by liquid chromatography in order to obtain as a result the sought fraction of iso-alkanes and cycloalkanes. Moreover, the methods described in these publications also comprise at least one intermediate evaporation step of the intermediate fractions collected before the second separation step, this intermediate evaporation step being optionally preceded by a filtration step, as in the publication by M. Audino et al.

However, the increase in the number of steps necessarily increases the risks of loss and/or contamination of the samples. More particularly, the intermediate evaporation step of the collected fractions can lead to the more or less partial loss of the lightest compounds such as the adamantanes.

The aim of the present invention is therefore to provide a method for separating by liquid chromatography a fraction of iso-alkanes and cycloalkanes from a sample of a mixture of organic compounds at least partially overcoming the aforementioned drawbacks.

More particularly, the invention relates to a separation method which allows the isolation, from a sample of such a mixture of organic compounds, of a fraction of iso-alkanes and cycloalkanes (containing in particular the diamondoids) in a minimum number of steps, without the risk of contamination of the samples and/or the loss of compounds, in particular the lightest compounds, caused by the intermediate evaporation and optional filtration steps of the methods of the prior art.

SUMMARY OF THE INVENTION

For this purpose, the present invention proposes a method for separating a fraction of iso-alkanes and cycloalkanes from a sample of a mixture of organic compounds comprising a separation step by liquid chromatography, this separation step comprising:

the introduction of the sample into a column (1) comprising at least two stationary phases (11, 12), the first stationary phase (11) being of a material capable of adsorbing the acyclic apolar compounds and the second stationary phase (12) being of a material capable of adsorbing the aromatic compounds and the polar compounds, the elution by an eluent, and the collection of the eluted fraction.

According to preferred embodiments, the invention comprises one or more of the following features:

the mixture of organic compounds originating from a deposit of crude oil, shale oils or petroleum cuts.

the mixture of organic compounds comprises biomarkers selected from the adamantanes, the diamantanes and the triamantanes.

the first stationary phase (11) is of a material capable of adsorbing the n-alkanes.

the first stationary phase (11) comprises a zeolite of sodium aluminosilicate type, advantageously a ZSM-5 zeolite silicalite. Preferentially, the first stationary phase (11) is essentially constituted by a zeolite of sodium aluminosilicate type, advantageously a ZSM-5 zeolite silicalite the second stationary phase (12) is of a material capable of adsorbing the aromatic and polar compounds.

the second stationary phase (12) comprises a silica impregnated with silver nitrate. Preferentially, the second stationary phase (12) is essentially constituted by a silica impregnated with silver nitrate the column (1) further comprises a third stationary phase (13) of a material capable of adsorbing the compounds in which the polarity is greater than the polarity of the compounds adsorbed by the material of the second stationary phase (12).

the third stationary phase (13) is of a material capable of adsorbing the high molecular weight and/or heteroatomic compounds, in particular the heteroalkyls comprising at least one atom selected from: N, S and O, and/or the resins and asphaltenes with molecular weights comprised between approximately 300 and 10,000 g/mol.

the third stationary phase (13) comprises a silica selected from a virgin silica, a silica grafted with aminoalkyl groups, in particular aminopropyls and a silica grafted with cyanoalkyl groups and preferentially with cyanopropyl groups. Preferentially, the third stationary phase (13) is essentially constituted by a silica selected from a virgin silica, a silica grafted with aminoalkyl groups, in particular aminopropyls and a silica grafted with cyanoalkyl groups and preferentially with cyanopropyl groups.

following the direction of elution, the optional third stationary phase (13) is arranged before the second stationary phase (12), the second stationary phase (12) being itself arranged before the first stationary phase (11).

the separation step by liquid chromatography is a separation step by low pressure chromatography, in which the liquid phase is eluted under a pressure of less than 25 bars, advantageously comprised between 3 and 10 bars and, preferably, comprised between 7 and 9 bars.

the eluent is selected from isooctane, n-octane and mixtures thereof, advantageously iso-octane.

the method further comprises at least one step of preparation of the sample prior to the separation step, this preparation step being selected from a solubilizing step, a filtration step, a heating step or the combination of two or more of these steps.

The present invention makes it possible to overcome the drawbacks of the methods of the prior art. More particularly, the present invention provides a method for separating a fraction of iso-alkanes and cycloalkanes from a sample of a mixture of organic compounds, in particular of a mineral oil, which is both simple and rapid, and comprising a limited number of steps with respect to the methods of the prior art. The separation method according to the invention makes it possible in particular to avoid the risks of contamination and/or the loss of certain compounds present in the oil sample, risks which are inherent at the increase in the number of steps of the methods of the prior art, and in particular the intermediate evaporation steps, optionally preceded by intermediate filtration steps.

This result is achieved due to the implementation of a separation step by liquid chromatography carried out by means of a chromatographic column comprising at least two stationary phases, the first stationary phase being of a material capable of adsorbing the acyclic apolar compounds present in the sample and a second stationary phase being of a material capable of adsorbing the aromatic and polar compounds present in the oil sample. Optionally, a third stationary phase capable of retaining the very polar compounds can be provided.

Thus, the fraction of iso-alkanes and cycloalkanes, which comprises in particular the diamondoids, is collected on leaving the column while the other compounds present in the sample, such as the n-alkanes, the aromatic compounds, the resins and the asphaltenes, and optionally the heteroalkyls, are adsorbed on the stationary phases of the column.

The method according to the invention makes it possible both to optimize, in one step, the selectivity of the chromatographic separation with respect to the known methods of the prior art, and to allow the collection, on leaving the column, of a larger fraction of iso-alkanes and cycloalkanes with respect to the initial content of these compounds in the oil sample. In particular more than 85% of the iso-alkanes and the cycloalkanes present in the sample of the mixture of organic compounds can be collected, while the current separation methods make it possible to collect at best 50% of the iso-alkanes and the cycloalkanes present in a sample.

The invention more particularly relates to the oily fractions originating from oil. In particular, it relates to crude oil and to the mixtures of oils originating from the refining of crude oil.

The separation method according to the invention also has the advantage of being easily reproducible, providing reliable results and with analysis times that are shorter than those of the methods of the prior art.

The separation method according to the invention can be implemented on an analytical scale (a few µl of sample) or on a preparative scale (a few hundred µl of sample, typically of the order of 300 µl). The conditions of separation on an analytical scale by low pressure liquid chromatography can be directly extrapolated by a person skilled in the art to a preparative scale by means of routine calculations.

The invention also relates to a method for separating diamondoids from a sample of a mixture of organic compounds. This method comprises the implementation of the separation method as described above followed by a step for separating the diamondoids from the eluted fraction.

Moreover, the invention relates to a separation kit by liquid chromatography. Such a kit comprises a column (1) provided with an inlet (1a) allowing the introduction of products and eluent and an outlet (1b) allowing the recovery of the eluted fractions, column (1) comprising at least two stationary phases, the first stationary phase (11) being of a material capable of adsorbing the acyclic apolar compounds and the second stationary phase (12) being of a material capable of adsorbing the aromatic and polar compounds.

According to the preferred embodiments, the kit according to the invention comprises one or more of the following features:
- the column (1) further comprises a third stationary phase (13) of a material capable of adsorbing the compounds in which the polarity is greater than the polarity of the compounds adsorbed by the material of the second stationary phase (12).
- the first stationary phase (11) is of a material capable of adsorbing the n-alkanes and comprises, advantageously, a zeolite of sodium aluminosilicate type, advantageously a ZSM-5 zeolite silicalite.
- the second stationary phase (12) is of a material capable of adsorbing the aromatic and polar compounds and comprises, advantageously, a silica impregnated with silver nitrate.
- the third stationary phase (13) is of a material capable of adsorbing the high molecular weight and/or heteroatomic compounds. The third stationary phase comprises, advantageously, a silica selected from a virgin silica, a silica grafted with aminoalkyl groups in particular aminopropyls and a silica grafted with cyanoalkyl groups and preferentially with cyanopropyl groups.
- following the direction of elution, the optional third stationary phase (13) is arranged before the second stationary phase (12), the second stationary phase (12) being itself arranged before the first stationary phase (11).

The invention also relates to a device for separating by liquid chromatography and analysis a sample. Such device comprises a kit as described above,
   means (5) for introducing the sample into column (1),
   means (4) for introducing at least one eluent into column (1),
   optionally means for pressurizing column (1),
   optionally the means for the detection and analysis (7) of the eluted fractions, and
   means for collecting (8) the eluted fractions.

According to a particular embodiment, the separation method according to the invention is implemented by means of the kit and/or by means of the device according to the invention.

Finally, the invention relates to a use of the kit and/or of the device for separating a fraction of iso-alkanes and cycloalkanes in particular of diamondoids from a sample comprising a mixture of organic compounds, this mixture being able in particular to originate from a deposit of crude oil, shale oils or petroleum cuts.

BRIEF DESCRIPTION OF THE FIGURES

FIG. 3A corresponding to the chromatogram of a sample before implementation of the separation method according to the invention and FIG. 3B corresponding to the chromatogram of a fraction of iso-alkanes and cycloalkanes collected after implementation of the separation method according to the invention.

FIGS. 5A and 5B illustrate the time window comprised between 20 and 40 minutes, which corresponds to the time window for retention of the adamantanes, while FIGS. 6A and 6B illustrate the time window comprised between 40 and 60 minutes, which corresponds to the time window for retention of the diamantanes.

Figure 1:
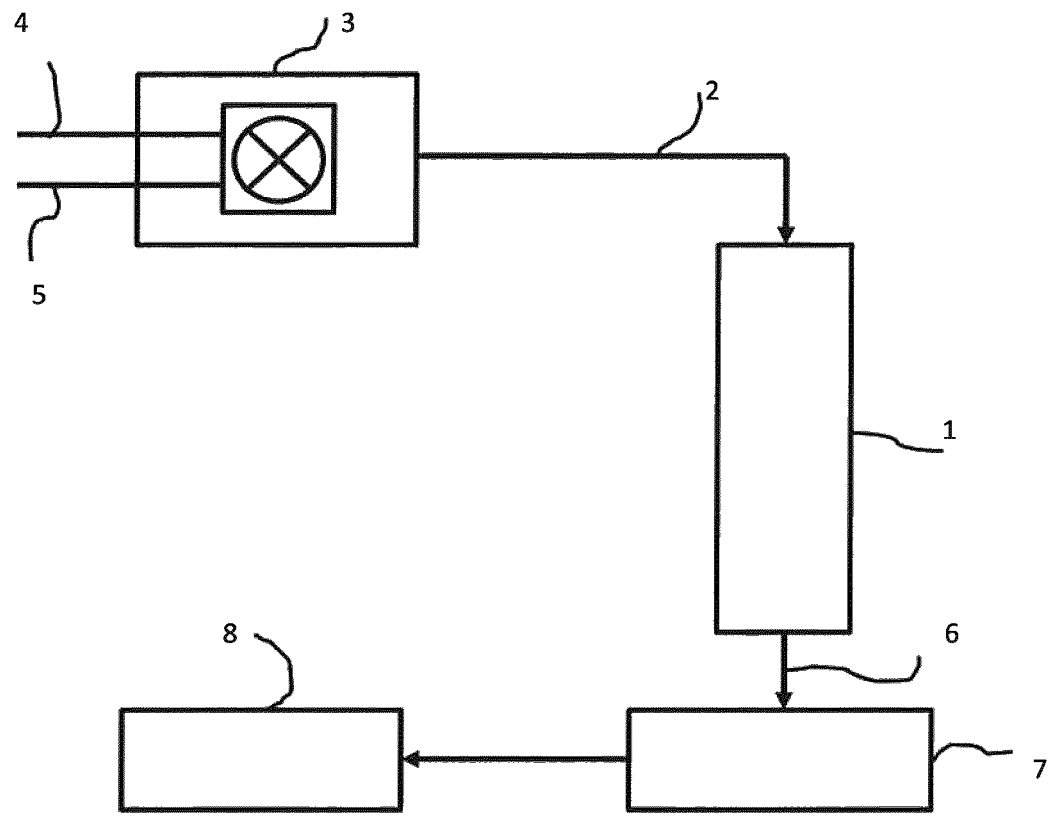
FIG. 1 represents a schematic diagram of an embodiment of the separation device by liquid chromatography and analysis according to the invention, this device comprising the separation kit by liquid chromatography according to the invention.

In order to allow the identification of the diamondoids identified by their commonly used abbreviation as it appears in FIGS. 5B, 6B and 8, reference can be made to Table 1 below which specifies, for each diamondoid, its empirical formula, its CAS registry number as well as its abbreviation.

TABLE 1

| Compounds | Abbreviations | Empirical formula | CAS No. |
|---|---|---|---|
| Adamantane | A | $C_{10}H_{16}$ | 281-23-2 |
| 1-Me-adamantane | 1-MA | $C_{11}H_{18}$ | 768-91-2 |
| 1,3-diMe-adamantane | 1,3-dMA | $C_{12}H_{20}$ | 702-79-4 |
| 1,3,5-triMe-adamantane | 1,3,5-tMA | $C_{13}H_{22}$ | 707-35-7 |
| 1,3,5,7-tetraMe-adamantane | 1,3,5,7-tetraMA | $C_{14}H_{24}$ | 1687-36-1 |
| 2-Me-adamantane | 2-MA | $C_{11}H_{18}$ | 700-56-1 |
| Cis-1,4-diMe-adamantane | 1,4-dMA,cis | $C_{12}H_{20}$ | 24145-89-9 |
| Trans-1,4-diMe-adamantane | 1,4-dMA, trans | $C_{12}H_{20}$ | 24145-88-8 |
| 1,3,6-triMe-adamantane | 1,3,6-tMA | $C_{13}H_{22}$ | 24139-37-5 |
| 1,2-diMe-adamantane | 1,2dMA | $C_{12}H_{20}$ | 16207-81-1 |
| Cis-1,3,4-triMe-adamantane | 1,3,4-tMA,cis | $C_{13}H_{22}$ | 24145-90-2 |
| Trans-1,3,4-triMe-adamantane | 1,3,4-tMA, trans | $C_{13}H_{22}$ | 24145-91-3 |
| 1,2,5,7-tetraMe-adamantane | 1,2,5,7-tetraMA | $C_{14}H_{24}$ | 34946-70-7 |
| 1-Et-adamantane | 1-EA | $C_{12}H_{20}$ | 770-69-4 |
| 1-Et-3-Me-adamantane | 1-E-3-MA | $C_{13}H_{22}$ | 1687-34-9 |
| 1-Et-3,5-diMe-adamantane | 1-E-3,5-dMA | $C_{14}H_{24}$ | 1687-35-0 |
| 2-Et-adamantane | 2-EA | $C_{12}H_{20}$ | 14451-87-7 |
| Diamantane | D | $C_{14}H_{20}$ | 2292-79-7 |
| 4-Me-diamantane | 4-MD | $C_{15}H_{22}$ | 28375-86-2 |
| 4,9-diMe-diamantane | 4,9-dMD | $C_{16}H_{24}$ | 70459-27-7 |
| 1-Me-diamantane | 1-MD | $C_{15}H_{22}$ | 26460-76-4 |
| 1,4 and 2,4-diMe-diamantane | 1,4 & 2,4-dMD | $C_{16}H_{24}$ | 74340-66-8 74340-67-9 |
| 4,8-diMe-diamantane | 4,8-dMD | $C_{16}H_{24}$ | 70340-68-0 |
| TriMe-diamantane | tMD | $C_{17}H_{26}$ | |
| 3-Me-diamantane | 3-MD | $C_{15}H_{22}$ | 30545-28-9 |
| 3,4-diMe-diamantane | 3,4-dMD | $C_{16}H_{24}$ | 70340-69-1 |
| Triamantane | T | $C_{18}H_{24}$ | 13349-10-5 |
| 9-Me-triamantane | 9-MT | $C_{19}H_{26}$ | 67615-85-4 |
| DiMe-triamantane | dMT | $C_{21}H_{30}$ | |

DETAILED DESCRIPTION

Firstly, the invention relates to a method for separating iso-alkanes and cycloalkanes from a sample of organic compounds by a method comprising at least one chromatography step. This chromatography step is implemented by means of a column comprising a succession of two or three stationary phases.

The first stationary phase is of a material capable of adsorbing the acyclic apolar compounds, in particular the n-alkanes. The second stationary phase (12) is of a material capable of adsorbing the aromatic compounds and the polar compounds (resins, asphaltenes). The third stationary phase, which is optional, is of a material capable of adsorbing the compounds in which the polarity is greater than the polarity of the compounds adsorbed by the material of the second stationary phase, in particular the compounds of high molecular mass such as the resins and asphaltenes with molecular masses comprised between approximately 300 and 10,000 g/mol and/or the heteroatomic compounds, in particular those based on N, S and/or O. A person skilled in the art knows the materials capable of satisfying each of these three conditions and can, by a simple routine test, verify whether or not a material is suitable for this use. He can in particular test, for each family of compounds, if it is retained or not on a support, under the elution conditions which are described below in the experimental part. Advantageously, each of the stationary phases is selected so as to retain at least 95% by mass, with respect to the total mass of the sample, of the compounds listed above respectively for each stationary phase, better at least 98%, even better at least 99%.

Also advantageously, the stationary phases are selected so as to allow the elution through the chromatography column of at least 70% by mass, with respect to the total mass of the sample, of the iso-alkane and cycloalkane compounds, and in particular the compounds of interest listed above, better at least 75%, even better at least 80%, preferentially at least 85%, advantageously at least 90%, and even more advantageously at least 95%.

The separation method of the invention more particularly relates to the mixtures of organic compounds originating from a deposit of crude oil, shale oils or petroleum cuts. This method more particularly relates to the mixtures of organic compounds comprising, besides one or more compounds as described above and that it is sought to remove, one or more compounds of interest selected in particular from: the cycloalkanes, and the diamondoids, in particular the adamantanes, the diamantanes and the triamantanes, the tricyclic terpanes, the hopanes, the steranes; the iso-alkanes may be mentioned, and pristane, phytane may be mentioned.

The stationary phases are denoted by the name first, second and third stationary phase throughout the description with reference to their order of introduction into the chromatography column. When the chromatography column is eluted, the eluent firstly passes through the third stationary phase (if present), then the second, then the first stationary phase.

The method of the invention can include, besides the elution step described below in detail, other steps, in particular steps for the preparation of samples, but also steps for the treatment of the eluted fractions. Finally, it can be provided that the method comprises a treatment of the column after elution of the interest compounds (iso-alkane and cycloalkane biomarkers) so as to collect certain components of the sample which were retained on one of the stationary phases.

DESCRIPTION OF EMBODIMENTS OF THE INVENTION

Other characteristics and advantages of the invention will become apparent on reading the following description of a preferred embodiment of the invention, given by way of example and with reference to the attached figures.

Separation Device

Figure 2:
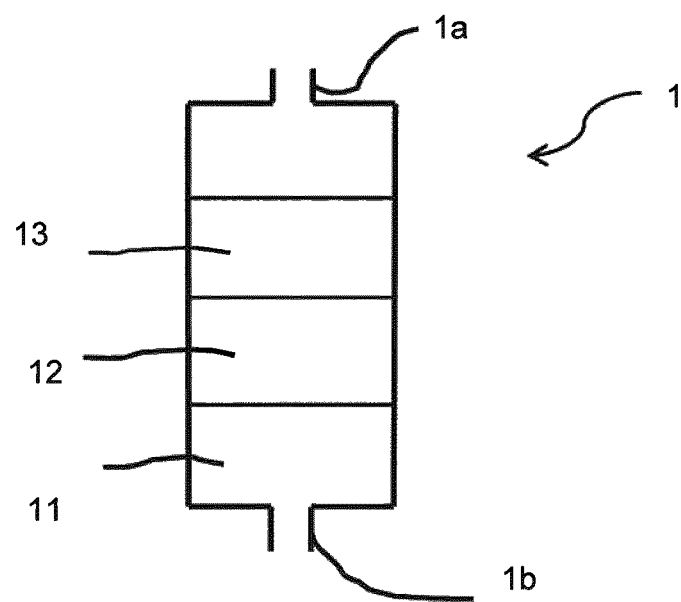
FIG. 2 represents a detailed diagram of an embodiment of the separation kit by liquid chromatography according to the invention.

FIG. 1 represents a schematic diagram of an embodiment of the device for separating by liquid chromatography and analysis a fraction of iso-alkanes and cycloalkanes from a sample of a mixture of organic compounds according to the invention. This separation device can advantageously implement the separation kit by liquid chromatography according to the invention as represented in FIG. 2.

The separation device comprises a column 1 which is an extraction column on a solid phase, also called an SPE column.

This column 1 is connected upstream by the means of connection 2 to a pump system 3. This pump system 3 is itself connected upstream to means 4 for introducing the mobile phase or eluent.

The means 5 for introducing the sample of the mixture of organic compounds can be connected upstream of the column 1 using an injection device situated downstream of the pump system 3 (variant not shown in FIG. 1). But, advantageously, and as shown diagrammatically in FIG. 1, the means 5 for introducing the sample are also directly connected to the pump system 3, which has the advantage of limiting the risks of pollution and/or the loss of compounds present in the sample due to the absence of a joint.

The column 1 is connected downstream, by the means of connections 6, to the means 7 for detecting and analyzing the compounds forming the eluted fraction. These detection and analysis means 7, which can for example be constituted by a differential refractometer, are themselves connected to the means 8 for collecting the eluted fraction isolated from the sample.

According to a variant, it can be provided that the separation device according to the invention comprises the collection means 8, but not the analysis means and that the analysis of the eluted fractions is carried out separately.

The assembly constituted by the column 1 and the connection means 2, 6 is known as a DASi™ (Dissolve Absorb Sample injection) module. Such a module is commonly used for the introduction, into a chromatographic column, of compounds having a high viscosity or a low solubility. The implementation of such a module makes it possible to easily change the column 1 after the use thereof.

According to the invention, the column 1 generally comprises at least two stationary phases.

Advantageously, the separation device comprises the means for automating the method (non shown), in particular means allowing the monitoring of the introduction of the samples into the columns, and/or the recovery of the eluted fractions leaving the column, and/or the monitoring of the analysis means, and/or the recovery and storage of the analytical data. Such means (computers and software) are well known to a person skilled in the art.

Separation Kit

In the illustration in FIG. 2, which represents an advantageous version of the separation kit by liquid chromatography of the invention, the column 1 is provided with an inlet 1a and an outlet 1b. The length of the column 1 is typically comprised between 5 and 15 cm, advantageously between 7 and 10 cm and, preferentially, between 7 and 8 cm while its internal diameter is typically comprised between 1.5 and 3 cm, advantageously between 1.5 and 2 cm and preferentially, between 1.5 and 1.7 cm.

The column 1 in FIG. 2 comprises three stationary phases 11, 12, 13.

The first stationary phase 11 is of a material capable of adsorbing the acyclic apolar compounds of the sample and, more particularly, the n-alkanes. Advantageously, the first stationary phase 11 comprises a zeolite selected from the zeolites of sodium aluminosilicate type, in particular those belonging to the family of the pentasils. Preferably, in these zeolites, the Si to Al molar ratio satisfies: Si/Al>10. For example the zeolite of ZSM-5 type of chemical formula:

$Na_nAl_nSi_{96-n} O_{192}.16H_2O$ (0<n<27), marketed by the company Fisher Scientific, may be mentioned. These zeolites can be used directly or be activated by a heat treatment.

Preferentially, the first stationary phase comprises a zeolite ZSM-5 marketed by the company Fisher Scientific. Advantageously, before its implementation, the zeolite ZSM-5 is activated by heating, in particular heating at a temperature of the order of 360° C. for 12 hours is recommended.

The second stationary phase 12 is of a material capable of adsorbing the aromatic compounds and the polar compounds of the sample (resins, asphaltenes). Advantageously, the second stationary phase 12 comprises a silica impregnated with silver nitrate $AgNO_3$. In particular the silica registered under the CAS number 7761-88-8 can be utilized having a particle size of 62 μm and a density of 4.35 g/ml at 25° C., this silica being in particular available from the company Sigma Aldrich. This silica impregnated with silver nitrate can be used directly, without prior treatment.

The third stationary phase 13 is of a material capable of adsorbing the compounds of the sample which have a polarity greater than the polarity of the compounds adsorbed by the material of the second stationary phase 12 and, more particularly, the compounds of high molecular mass such as the resins and asphaltenes with molecular masses comprised between approximately 300 and 10,000 g/mol and/or the heteroatomic compounds, in particular the heteroalkyls comprising one or more atoms selected from: N, S and O. Advantageously, the third stationary phase 13 comprises a silica which can be selected from a virgin silica, a silica grafted with aminoalkyl groups, in particular C1-C5 aminoalkyls, preferably aminopropyls and a silica grafted with cyanoalkyl groups, in particular C1-C5 cyanoalkyls, and, preferentially, with cyanopropyl groups. In particular a silica grafted with cyanopropyl groups can be used having a particle size comprised between 40 and 63 μm marketed by the companies Merck and VWR. This virgin or grafted silica which are suitable for the third stationary phase 13 can be used directly, without prior treatment.

As shown in FIG. 2, the third stationary phase 13 is arranged above the second stationary phase 12, this second stationary phase 12 itself being arranged above the first stationary phase 11. According to a particularly preferred version of the invention, the column 1 comprises the following three successive stationary phases 11, 12, 13, listed from the bottom to the top of the column 1, in the opposite direction to the direction of elution:

- the zeolite ZSM-5 as first stationary phase 11, this zeolite advantageously being activated by a prior heat treatment as described above,
- a silica impregnated with silver nitrate as second stationary phase 12, and
- a silica grafted with the cyanopropyl groups as third stationary phase 13.

$M_{P1}$, $M_{P2}$, $M_{P3}$ denote respectively the masses of the first, the second and the third stationary phase. These masses advantageously satisfy the following relationships.

Preferably $M_{P2} \leq M_{P1} \leq 3 M_{P2}$
$M_{P3} \leq M_{P1} \leq 5 M_{P3}$
$M_{P3} \leq M_{P2} \leq 3 M_{P3}$ Even more preferentially, $M_{P2} \leq M_{P1} \leq 2 M_{P2}$
$M_{P3} \leq M_{P1} \leq 4 M_{P3}$
$M_{P3} \leq M_{P2} \leq 2.5 M_{P3}$ In the example implemented below, the quantities of each stationary phase are the following:

$MP_1$=3.9-4.0 g
$MP_2$=2.3-2.4 g
$MP_3$=1.3-1.4 g

Separation Method

The separation method according to the invention, which utilizes a separation step by liquid chromatography, can be implemented by using the above-described separation kit and device.

Before the introduction of the sample comprising a mixture of organic compounds, the column 1 is stabilized by rinsing with solvent. Preferably, the solvent used is identical to that which will be used for the elution step. Advantageously, isooctane is used. The sample of the mixture of organic compounds is then solubilized with the eluent then the solution thus obtained is introduced into the pump system 3 by the introduction means 5, then into the column 1 by the connection means 2.

The sample which is introduced in solution into the eluent in the column 1, via the introduction means 5, the pump system 3 and the connection means 2, can be a sample of the mixture of organic compounds, such as a crude oil sample, i.e. a mixture which has undergone no prior treatment.

It is however quite possible to envisage the provision of a step of preparation of the sample which is prior to the separation step. This preparation step can in particular consist of a step of solubilizing the sample with or without a subsequent filtration step. Heating the sample can also be carried out. These preparatory steps can also be combined together.

Thus, in the particular case where the sample of the mixture of organic compounds comprises asphaltenes, it is particularly advantageous to carry out such a preparation step. This preparation step can in particular consist of solubilizing the crude sample, for example in pentane or in iso-octane, then filtering the solid particles formed, among which are the asphaltenes which have precipitated from the pentane, for example by means of a filter with a pore diameter of the order of 0.45 μm. The filtrate is then subsequently solubilized with the eluent, next the solution obtained is then introduced into the pump system 3 by the introduction means 5, then into the column 1 by the connection means 2.

The high molecular weight and/or heteroatomic compounds, in particular the very polar compounds, asphaltenes and resins, based on N, S and/or O, present in the sample are adsorbed by the third stationary phase 13 while the less polar, aromatic compounds are adsorbed by the second stationary phase 12 of the column 1 and the acyclic apolar compounds and in particular the n-alkanes are adsorbed by the first stationary phase 11.

The mobile phase or eluent is then introduced, by the introduction means 4, into the pump system 3 then, by the connection means 2, into the column 1.

Elution by the mobile phase can be a gradient elution or an isocratic elution. The mobile phase can be selected from n-octane, isooctane and mixtures thereof. The mobile phase or eluent is advantageously isooctane (at 100%).

The separation step by liquid chromatography can be carried out at atmospheric pressure but it is preferably, implemented under pressure, either in an open column at low pressure, or by means of a medium pressure liquid chromatography (MPLC) device, or using a high performance liquid chromatography (HPLC) device. For this purpose, the device according to the invention advantageously comprises means allowing pressurization of the column 1.

Preferably, this separation step is a separation step using so-called "flash" or low pressure chromatography. Typically, a pressure of an inert gas is applied, by means of the pump system 3, for circulation of the mobile phase along the column 1. This applied pressure, monitored using a manometer (not shown) incorporated into the pump system 3, can in particular be comprised between 7 and 9 bars (i.e. approximately 100 psi). Thus, the separation step is carried out at mobile phase flow rates that are higher than with a separation at atmospheric pressure.

The eluted fractions collected at the base of the column 1 are then carried out, by the connection means 6, into the detection and analysis means 7 then into collection means 8 for an optional subsequent use of said fractions.

The eluted fractions can also be collected directly at the outlet of the column and subsequently analyzed. In particular, the configuration of the different elements of the device and the means used for the analysis depend on the objective sought, namely whether the separation method is to be utilized on an analytical scale or on a preparative scale.

These detection and analysis means 7 can in particular be constituted by a differential refractometer (DR), a UV detector, a flame ionization detector (FID) or also a mass spectrometer.

Among these detection and analysis means 7 which have just been mentioned, the actual detection means are distinguished from the analysis means.

In particular, the differential refractometer (DR) is a non destructive detection means, which monitors the start and end of the peak of the iso-alkanes and cycloalkanes and allows the fraction of iso-alkanes and cycloalkanes to be collected selectively. The UV detector, which is also a non destructive detection means, can be coupled with the device according to the invention with the aim of monitoring the absence of aromatic compounds in the eluted fractions collected at the base of the column 1. It could thus be arranged upstream of the differential refractometer.

The flame ionization detector (FID) and the mass spectrometer make it possible to analyze the eluted fractions collected at the base of the column 1.

Other means for the detections could also be utilized in the device according to the invention. For example an Evaporative Light-Scattering Detector (ELSD) may be mentioned, which is a destructive detection means. As a result this must be arranged, using a by-pass, upstream of the collection means 8, in order to channel a small portion of the eluted fractions collected at the base of the column 1 for analysis, the other portion of the eluted fractions being collected in the collection means 8.

Once the separation method is completed, the column 1 can be detached from the device and replaced by a new column.

According to a variant, the recovery of one or more fractions retained on the column by an appropriate treatment can be provided.

EXAMPLE

An oil sample originating from a deposit of crude oil and rich in benzene and other aromatic compounds was introduced into a separation kit according to the invention. The separation method was carried out using a column 7.5 cm in length and 1.7 cm in diameter comprising the following three stationary phases in the quantities indicated:
- the zeolite ZSM-5 as first stationary phase 11, $M_{P1}$=3.9-4.0 g,
- a silica impregnated with silver nitrate (CAS 7761-88-8) as second stationary phase 12, $M_{P2}$=2.3-2.4 g, and
- a silica grafted with cyanopropyl groups (provided by Merck) as third stationary phase 13, $M_{P3}$=1.3-1.4 g.

The separation method was carried out by so-called "flash" chromatography, under the particular operating conditions indicated in Table 2 below.

TABLE 2

| Mobile phase | isooctane (100%) |
|---|---|
| Elution mode | isocratic |
| Flow rate | 1 or 2 ml/min |
| Temperature | ambient temperature (22° C.) |
| Pressure | 7 to 9 bars |
| Volume of sample injected | 300 µl maximum |
| Duration of the analysis | <than 10 min |

Analysis of the eluted products is carried out using the following apparatus:
"Flash" system coupled to an RD which monitors the start and end of the peak.
GC/FID: Agilent 7890 A Device.
GC column: CpSil5CB-100 m×530 µm×0.5 µm-0.33 bars-2.2107 ml/min Volume injected: 5 µL.
Oven: Initial temperature=30° C.→20 min-2° C./min→300° C.→35 min-Total run time=190 min
FID: Temperature=300° C.-Flow rate H2=30 ml/min-Flow rate air=400 ml/min.
Mass spectrometry (GC/MS):
Device: Hewlett Packard HP 6890.
GC column: DB-5-60 m×250 µm×0.10 µm-1.85 bars-1.8 ml/min (He) Volume injected: 2.5 µL (SPLIT mode)
Oven: Initial temperature=40° C.→6 min-2° C./min→300° C.→60 min-Total run time=196 min
MS: SIM mode-dwell time=70 ms-m/z of monitored ions: adamantanes: 135; 136; 149; 163; 177-diamantanes: 187; 188; 201; 215-triamantanes: 239; 240; 253.

Figure 5A:
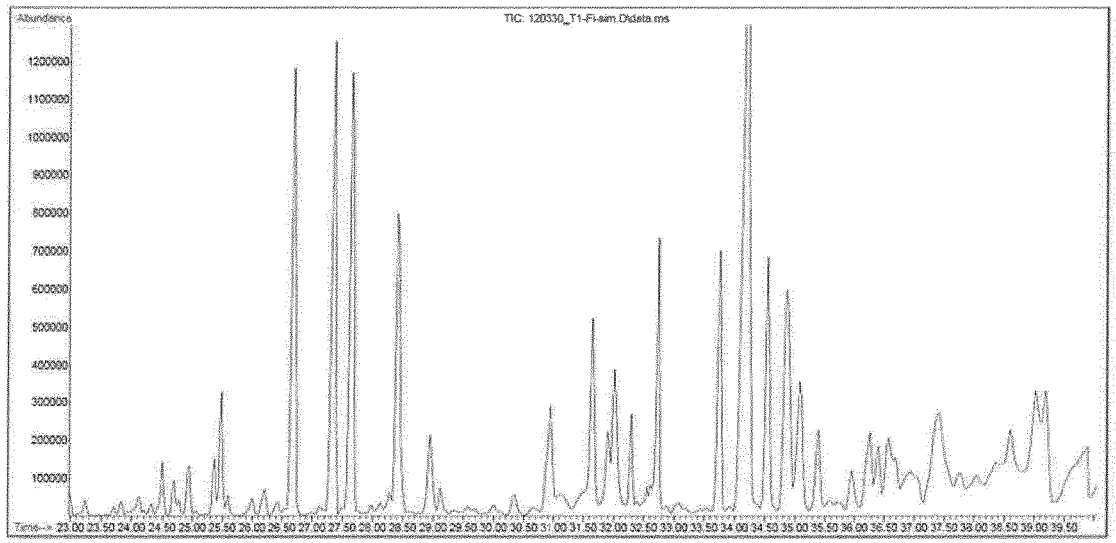
FIGS. 5A, 5B, 6A and 6B show four chromatograms originating from the analysis by gas chromatography coupled to total ionic current mass spectrometry (GC/MS) with TIC image in SIM (Single Ion Monitoring) mode, FIGS. 5A and 6A correspond to the chromatograms of the same sample before implementation of the separation method according to the invention and FIGS. 5B and 6B correspond to the chromatograms of a fraction of iso-alkanes and cycloalkanes collected after implementation of the separation method according to the invention. More particularly.
Figure 5B:
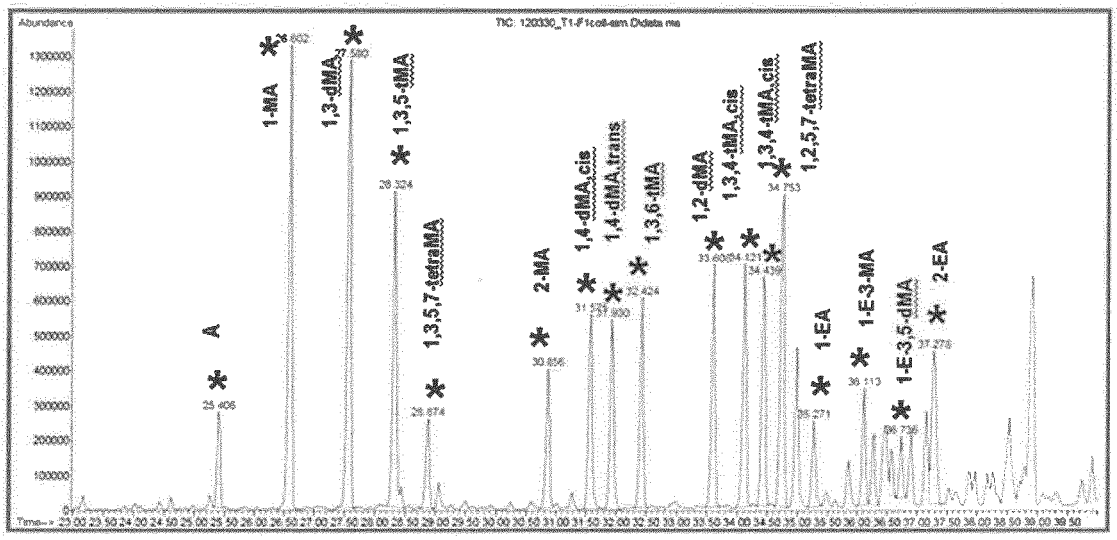
Figure 6A:
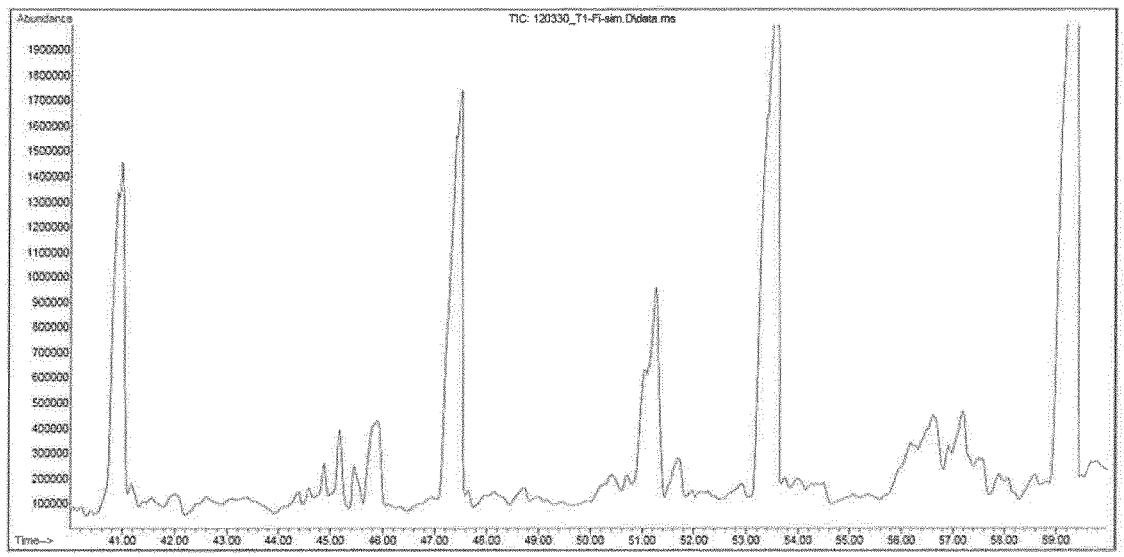
Figure 6B:
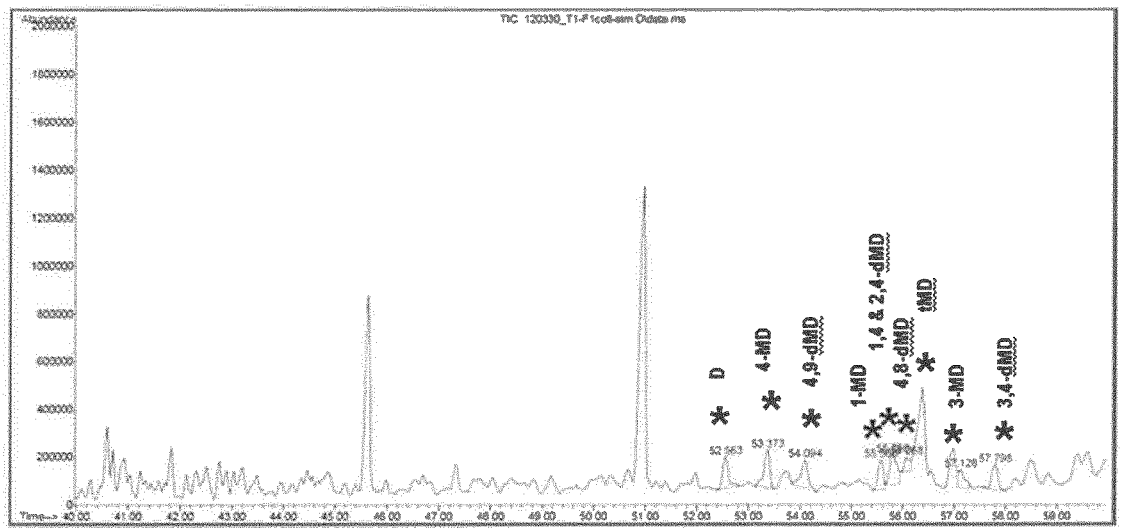
Figure 7:
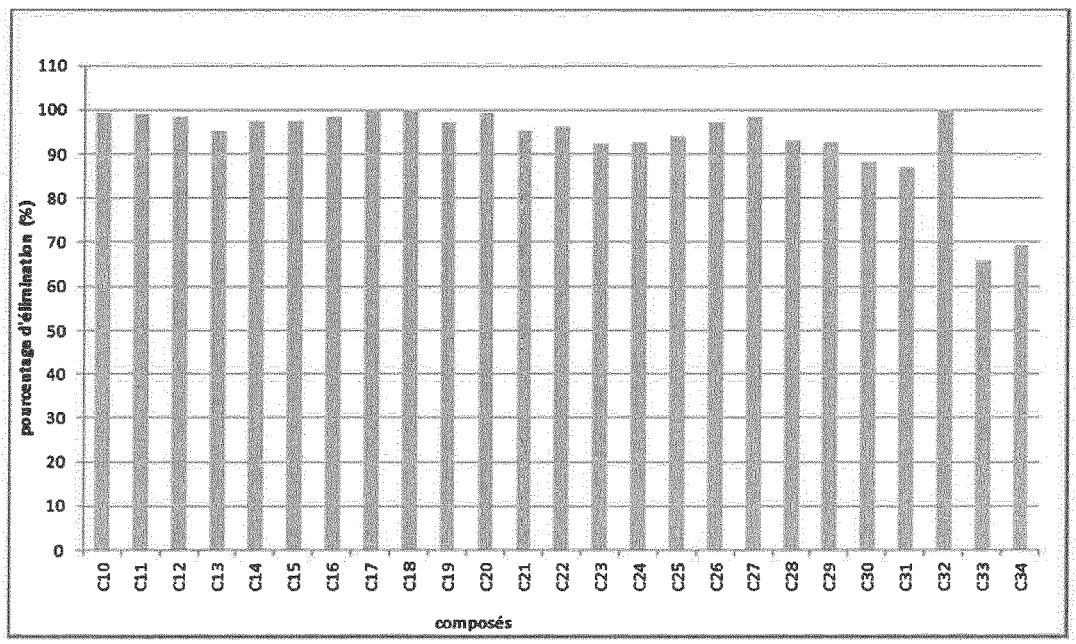
FIG. 7 is a histogram representative of the removal percentage of the n-alkanes in the fraction of iso-alkanes and cycloalkanes after implementation of the method according to the invention.
Figure 8:
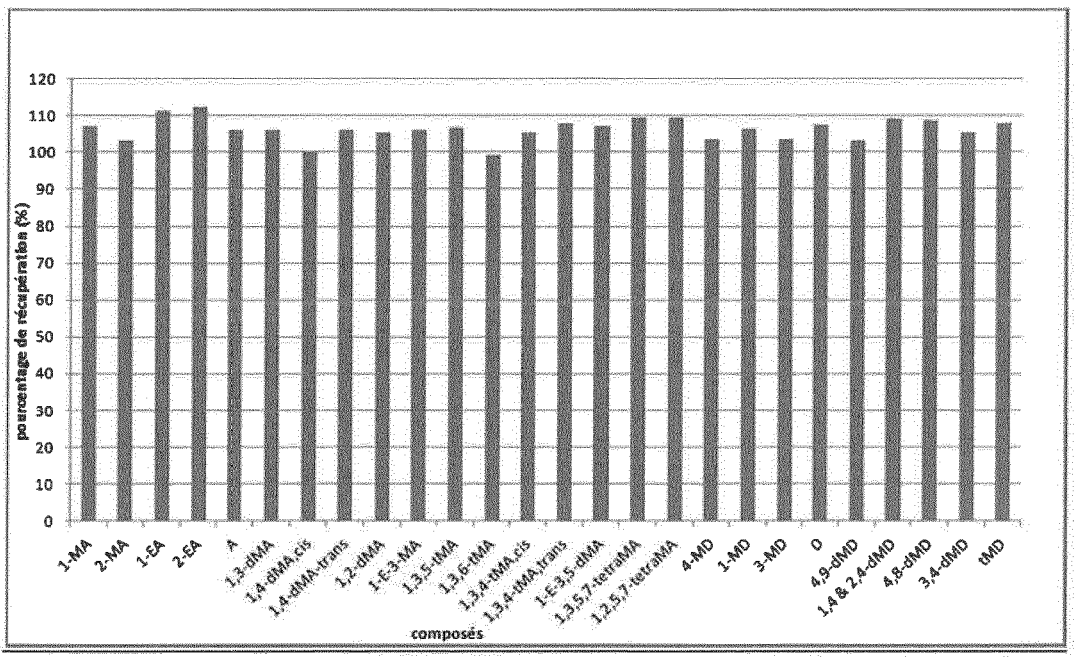
FIG. 8 is a histogram representative of the collection percentage of the diamondoids in the fraction of iso-alkanes and cycloalkanes collected after implementation of the method according to the invention.

The results of the qualitative and quantitative analyses carried out after implementation of the separation method under the operating conditions specified above are shown in the chromatograms in FIGS. 3A, 3B, 4A, 4B, 5A, 5B, 6A and 6B as well as in the histograms in FIGS. 7 and 8.

Figure 3A:
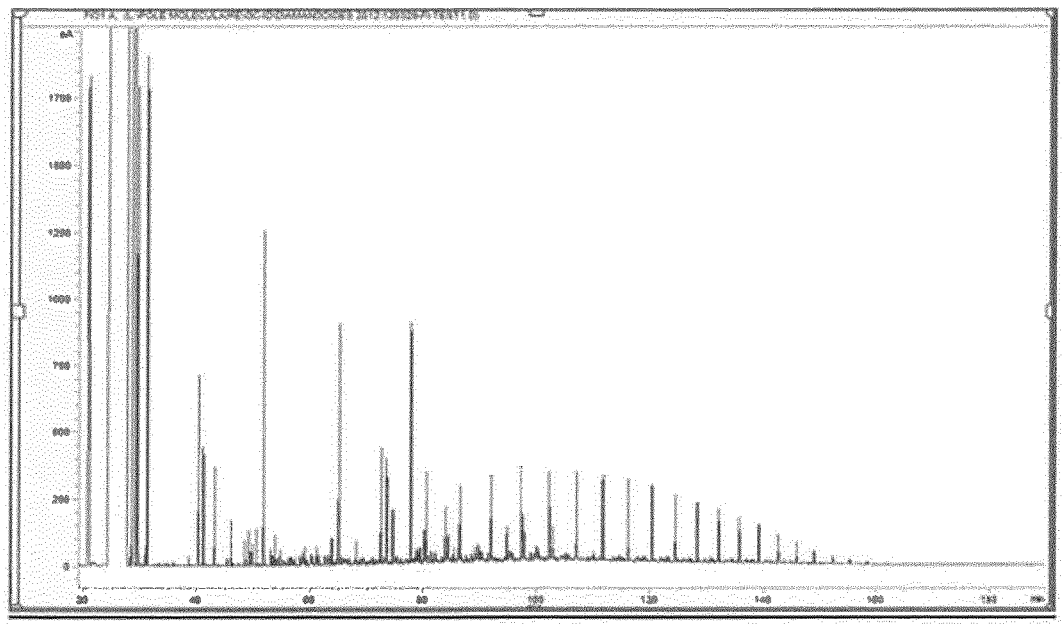
FIGS. 3A and 3B show two chromatograms originating from the analysis by gas chromatography with a flame ionization detector (GC/FID)
Figure 3B:
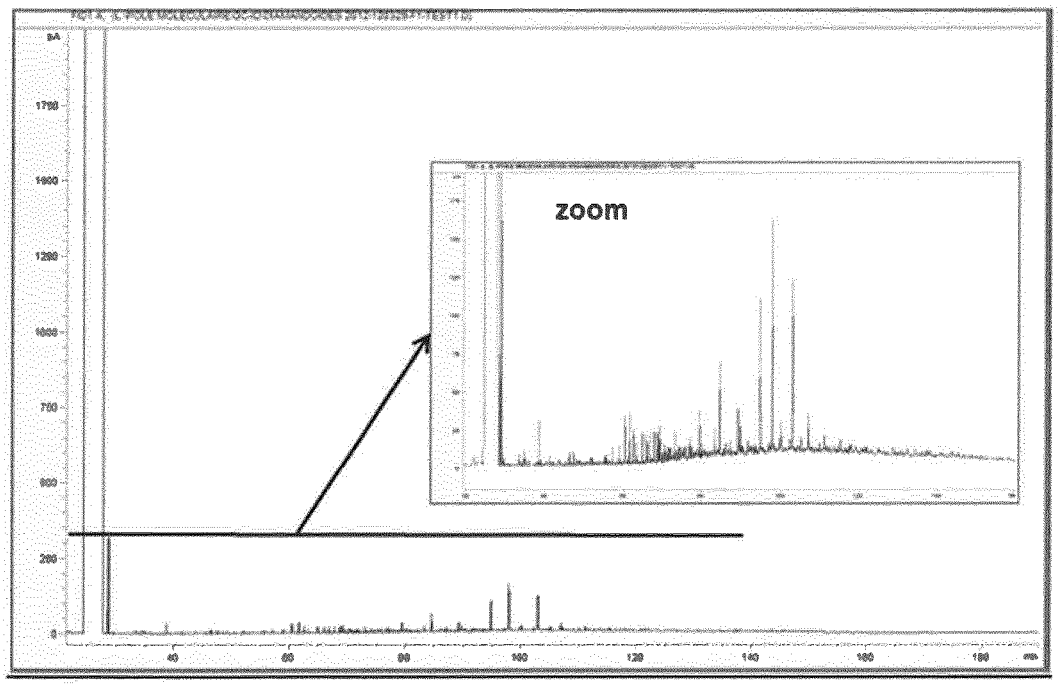
Figure 4A:
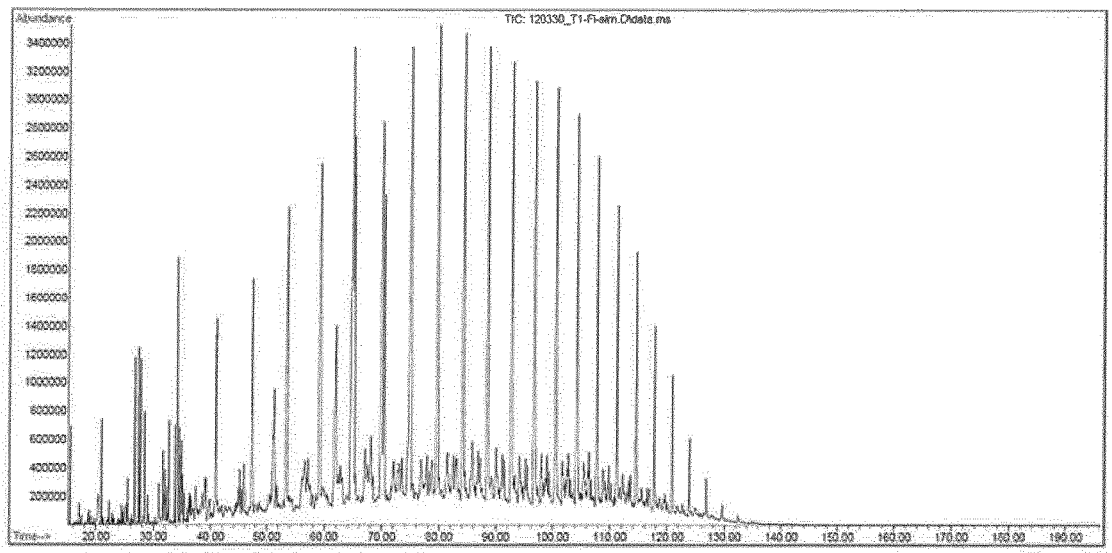
FIGS. 4A and 4B show two chromatograms originating from the analysis by gas chromatography coupled to total ion current mass spectrometry (GC/MS) with TIC image in SIM (Single Ion Monitoring) mode, FIG. 4A corresponds to the chromatogram of this same sample before implementation of the separation method according to the invention and FIG. 4B corresponds to the chromatogram of a fraction of iso-alkanes and cycloalkanes collected after implementation of the separation method according to the invention.
Figure 4B:
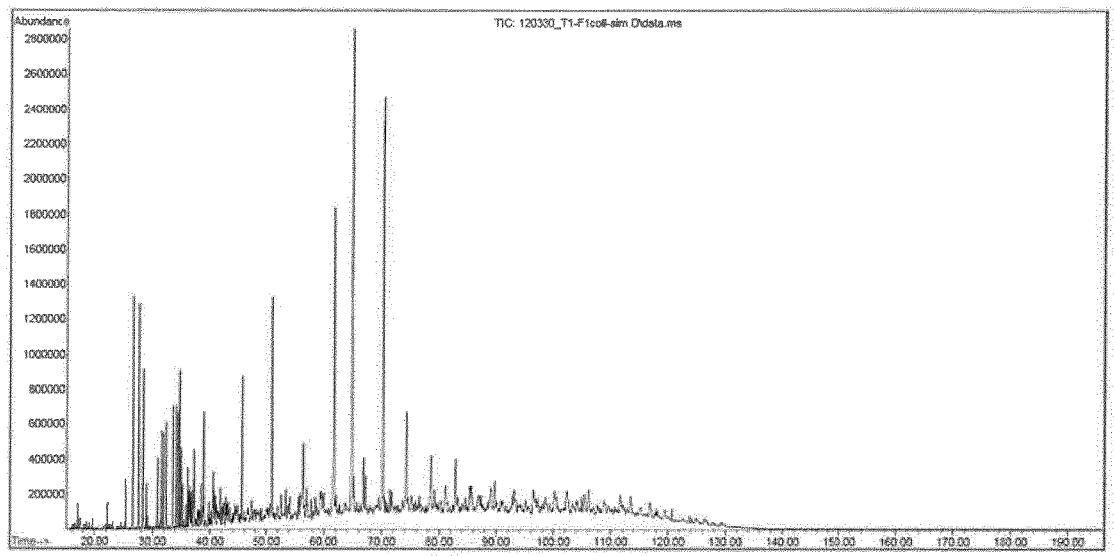

The chromatograms in FIGS. 3A and 3B, on the one hand, 4A and 4B on the other hand, are directly comparable, as they were carried out with the same dilution factor. Comparison of these chromatograms two by two shows that the separation method is very selective, with good removal of the n-alkanes, the aromatic compounds and the resins of the initial oil sample.

This selectivity is confirmed by the comparison of the chromatograms in FIGS. 5A and 5B, on the one hand, and those shown in FIGS. 6A and 6B, on the other hand.

As for the good removal of the n-alkanes, it is confirmed by the histogram in FIG. 7. The histogram shown in FIG. 8 is constructed from the areas obtained by integration of the peaks on the ion extraction chromatograms. It shows moreover that the fraction of iso-alkanes and cycloalkanes collected comprises diamondoids in proportions which are roughly constant and greater than 85%, or even greater than 90% for the majority of these compounds, some even being close to 100%. Where columns exceed 100%, this is due to the analytical uncertainties.

It is observed that the separation method according to the invention, besides being simple to implement, selective in terms of collection of iso-alkanes and cycloalkanes and allowing this collection with a good yield level, is moreover rapid. By way of illustration, mention may be made of the fact that that the above separation method requires one and a half hours while the methods of the prior art require several hours, or even a full day.

The invention claimed is:

1. Method for separating a fraction of iso-alkanes and cycloalkanes from a sample of a mixture of organic compounds comprising one separation step by liquid chromatography, said mixture of organic compounds comprising iso-alkanes, cycloalkanes, n-alkanes, aromatic compounds, polar compounds, high molecular weight and/or heteroatomic compounds, said separation step comprising:
    the introduction of the sample into a single column comprising three stationary phases, the first stationary phase being of a material capable of adsorbing the n-alkanes, the second stationary phase being of a material capable of adsorbing the aromatic compounds and the polar compounds, and the third stationary phase being of a material capable of adsorbing the high molecular weight and/or heteroatomic compounds in which the third stationary phase comprises a silica selected from a silica grafted with aminoalkyl groups and a silica grafted with cyanoalkyl groups,
    the elution by an eluent selected from isooctane, n-octane and mixtures thereof whereby said separation is obtained, and
    the collection of the eluted fraction comprising iso-alkanes and cycloalkanes, and in said separation method, the third stationary phase is arranged before the second stationary phase, the second stationary phase is arranged before the first stationary phase, following the direction of elution.

2. Separation method according to claim 1, in which the mixture of organic compounds originates from a deposit of crude oil, shale oils or petroleum cuts.

3. Separation method according to claim 1 in which the mixture of organic compounds comprises biomarkers selected from the adamantanes, the diamantanes and the triamantanes.

4. Separation method according to claim 1, in which the first stationary phase comprises a zeolite of sodium aluminosilicate type.

5. Separation method according to claim 1, in which the second stationary phase comprises a silica impregnated with silver nitrate.

6. Separation method according to claim 1, in which the separation step by liquid chromatography is a separation step using low pressure chromatography, in which the liquid phase is eluted under a pressure of less than 25 bars.

7. Separation method according to claim 1 further comprising at least one step of preparation of the sample prior to the separation step, this preparation step being selected from a solubilization step, a filtration step, a heating step or the combination of two or more of these steps.

8. Method for separating a fraction of iso-alkanes and cycloalkanes from a sample of a mixture of organic compounds comprising the implementation of the separation method according to claim 1 followed by a step for separating diamandoids from the eluted fraction.

9. Separation method according to claim 4, in which the zeolite of sodium aluminosilicate type is a ZSM-5 zeolite silicalite.

10. Separation method according to claim 1, in which the heteroatomic compounds are heteroalkyls comprising at least one atom selected from: N, S and O.

11. Separation method according to claim 1, in which the silica grafted with aminoalkyl groups is grafted with aminopropyls groups and the silica grafted with cyanoalkyl groups is grafted with cyanopropyl groups.

* * * * *